United States Patent
Das et al.

(10) Patent No.: US 11,982,736 B2
(45) Date of Patent: May 14, 2024

(54) PERCEPTION SENSORS BASED FUSION SYSTEM FOR VEHICLE CONTROL AND METHOD THEREOF

(71) Applicant: KPIT TECHNOLOGIES LIMITED, Pune (IN)

(72) Inventors: Soumyo Das, Pune (IN); Kishan Kumar, Pune (IN); Milankumar Ambalal Sheta, Pune (IN); Prashantikumar Bipinchandra Vora, Pune (IN); Meer Reshma Sheerin, Pune (IN); Sabarish Raveendran Prasanna Nair, Pune (IN); Nithin Sukumar, Pune (IN)

(73) Assignee: KPIT TECHNOLOGIES LIMITED, Pune (IN)

( * ) Notice: Subject to any disclaimer, the term of this patent is extended or adjusted under 35 U.S.C. 154(b) by 631 days.

(21) Appl. No.: 17/218,914

(22) PCT Filed: Jul. 11, 2019

(86) PCT No.: PCT/IB2019/055918
§ 371 (c)(1),
(2) Date: Mar. 31, 2021

(87) PCT Pub. No.: WO2020/070563
PCT Pub. Date: Apr. 9, 2020

(65) Prior Publication Data
US 2022/0404488 A1    Dec. 22, 2022

(30) Foreign Application Priority Data

Oct. 1, 2018    (IN) .............................. 201821037180

(51) Int. Cl.
*G01S 13/931* (2020.01)
*G01S 13/66* (2006.01)
*G01S 13/86* (2006.01)

(52) U.S. Cl.
CPC ............ *G01S 13/931* (2013.01); *G01S 13/66* (2013.01); *G01S 13/867* (2013.01)

(58) Field of Classification Search
CPC ....... G01S 13/931; G01S 13/867; G01S 13/66
See application file for complete search history.

(56) References Cited

U.S. PATENT DOCUMENTS 8,199,046 B2 * 6/2012 Nanami ................ G01S 13/867
342/52
9,097,801 B2 * 8/2015 Kambe ................. G01S 13/931
(Continued)

FOREIGN PATENT DOCUMENTS

DE    10 2012 008 659    11/2012

OTHER PUBLICATIONS

Quoc Huy Do et al, Human Drivers Based Active-Passive Model for Automated Lane Change, Jan. 19, 2017. IEEE Intelligent Transporation Systems Magazine, pp. 42-56. (Year: 2017).

(Continued)

*Primary Examiner* — Peter M Bythrow
(74) *Attorney, Agent, or Firm* — FOLEY & LARDNER LLP

(57) ABSTRACT

An aspect of the present disclosure relates to a system implemented in a host vehicle, comprising: a radar based detection unit, comprising one or more radar sensors, for detecting one or more targets around the host vehicle; a vision based detection unit, comprising one or more image sensors, for detecting one or more targets in the field of view of the host vehicle; and a processing unit to: receive information corresponding to detected one or more targets from (Continued)

each of the radar based detection unit and the vision based detection unit; match each of the one or more targets detected by the radar based detection unit with one or more targets detected by vision based detection unit to identify a target as a matched target; categorize the matched target as a locked target; and track the locked target using information received from the radar based detection unit.

20 Claims, 12 Drawing Sheets

(56) References Cited

U.S. PATENT DOCUMENTS

| | | | | |
|---|---|---|---|---|
| 9,599,989 | B1* | 3/2017 | Brown | G01S 7/40 |
| 2006/0139204 | A1* | 6/2006 | Abe | G01S 13/931 |
| | | | | 342/52 |
| 2015/0109164 | A1* | 4/2015 | Takaki | G01S 13/931 |
| | | | | 342/27 |
| 2017/0160392 | A1* | 6/2017 | Brisimitzakis | G01S 7/24 |
| 2017/0315207 | A1* | 11/2017 | Baba | B60W 30/095 |
| 2018/0149742 | A1* | 5/2018 | Izadian | H01Q 1/428 |
| 2018/0182238 | A1 | 6/2018 | Fowe et al. | |
| 2018/0267142 | A1* | 9/2018 | Motoyama | G01S 7/4026 |
| 2019/0071074 | A1* | 3/2019 | Gokan | G01S 13/723 |
| 2019/0092330 | A1* | 3/2019 | Ide | B60W 30/18163 |
| 2019/0122040 | A1* | 4/2019 | Baldacci | G06V 20/52 |
| 2019/0391250 | A1* | 12/2019 | Cohen | G01S 13/87 |

OTHER PUBLICATIONS

Do Quoc Huy et al., Human Drivers Based Active-Passive Model for Automated Lane Change dated Jan. 19, 2017 2 pages.

International Search Report PCT/IB2019/055877 dated Nov. 21, 2019 4 pages.

Liu Peng et al., Trajectory Prediction of a Lane Changing Vehicle Based on Driver Behavior Estimation and Classification dated Oct. 8, 2014 6 pages.

* cited by examiner

PERCEPTION SENSORS BASED FUSION SYSTEM FOR VEHICLE CONTROL AND METHOD THEREOF

CROSS-REFERENCE TO RELATED APPLICATIONS

This application is a continuation of International Patent Application No. PCT/IB2019/055918, filed Jul. 11, 2019, which claims the benefit of and priority to Indian Patent Application No. 201821037180, filed Oct. 1, 2018, the disclosures of each of which are hereby incorporated by reference in their entirety.

TECHNICAL FILED

The present disclosure relates to the field of vehicle automation. More particularly, the present disclosure relates to system and method for confirmation, tracking and selection of a target that is utilized for vehicle control.

BACKGROUND

A robust and reliable vehicle detection system is one of the key elements in vehicle automation, which makes accurate and precise vehicle detection a subject of prime importance. Due to change in visibility of vehicles on the road owing to various conditions such as weather, glare, pollution or inherent human weakness many detection systems and devices utilizing different techniques have been developed. Existing techniques operable to detect vehicles or other objects in vicinity of a host vehicle are based on sensors such as Radio Detection and Ranging (RADAR), Light Detection and Ranging (LIDAR), ultrasound, camera and the like incorporated in the host vehicle.

Vehicles equipped with radar or vision based detection units to implement certain features of Advanced Driver Assistance Systems (ADAS) or Autonomous Drive (AD) Systems such as Auto Emergency Braking (AEB), Autonomous Cruise Control (ACC), Target path following, etc may experience unexpected performance due to inherent concerns with the said detection systems. For example, vision-based detection units may provide degraded performance due to inaccuracy in longitudinal distance and velocity of target vehicle that may occur because of low visibility conditions. Similarly, radar based detection unit may provide inaccurate lateral distance and velocity, and may detect non-vehicle object as target vehicle. Thus, there is high rate of false detection, which is mostly due to stationary non-vehicle objects. Further, these detection units may fail during highly cluttered environment, for example, when the host vehicle is driving within city limits. As existing techniques face above-mentioned and other disadvantages, they may hinder in development of efficient ADAS or AD systems including longitudinal and lateral control systems that are key elements of vehicle automation.

There is therefore need in the art to develop systems and methods for confirmation, tracking and selection of a target, which aids in controlling of the host vehicle and overcomes above-mentioned and other limitations of the existing techniques.

SUMMARY

The present disclosure relates to the field of vehicle automation. More particularly, the present disclosure relates to system and method for confirmation, tracking and selection of a target that is to be utilized for control of host vehicle.

According to an aspect of the present disclosure, a system implemented in a host vehicle, comprises: a radar based detection unit, comprising one or more radar sensors, for detecting one or more targets around the host vehicle and associating a radar target identifier with each of said detected one or more targets; a vision based detection unit, comprising one or more image sensors, for detecting one or more targets in the field of view of the host vehicle and associating a vision target identifier with each of said detected one or more targets; and a processing unit comprising a processor coupled with a memory, the memory storing the instructions executable by the processor to: receive information corresponding to detected one or more targets from each of the radar based detection unit and the vision based detection unit, wherein the information comprises lateral distance, longitudinal distance and velocity components of the detected one or more targets from the host vehicle; match each of the one or more targets detected by the radar based detection unit with one or more targets detected by vision based detection unit to identify a target as a matched target when said target is detected by both the radar based detection unit and the vision based detection unit; categorize the matched target as a locked target when said target is iteratively identified as the matched target for a pre-defined duration; and track the locked target using information received from the radar based detection unit, wherein said tracking is performed even in the event when said locked target is subsequently not detected by the vision based detection unit.

In an embodiment, the target is identified as the matched target when location of said target detected by the vision based detection unit is within any or a combination of a lateral error band or a longitudinal error band of location of said target detected by radar based detection unit.

In an embodiment, the longitudinal error band is larger than the lateral error band.

In an embodiment, the processing unit maintains a record of radar target identifiers and vision target identifiers of each of a set of targets, which are identified as matched targets.

In an embodiment, the processing unit further classifies each target of the set of targets into one or more classes based on attributes of the target.

In an embodiment, the processing unit further identifies a single target from a set of targets, which are identified as matched targets, by: separating each of the targets of the set of targets into either of lane targets or path targets based on class information of each of the targets; selecting a dominant target from targets associated with each class of the one or more classes; and selecting a single target from the selected dominant targets based on a priority level associated with each class of the one or more classes.

In an embodiment, the processing unit provides control signals for controlling of the host vehicle to an electronic control unit (ECU) operatively coupled with the processing unit and the host vehicle.

In an embodiment, the processing unit provides the control signals based on attributes and information of the selected single target.

Another aspect of the present disclosure relate to a method, carried out according to instructions stored in a computer implemented in a host vehicle, comprising: receiving information corresponding to detected one or more targets from each of a radar based detection unit and a vision based detection unit, wherein the information comprises lateral distance, longitudinal distance velocity components of the detected one or more targets from the host vehicle, and wherein a radar based detection unit comprises one or more radar sensors to detect one or more targets around the host vehicle and a vision based detection unit comprises one or more image sensors to detect one or more targets in the field of view of the host vehicle; matching each of the one or more targets detected by the radar based detection unit with one or more targets detected by vision based detection unit to identify a target as a matched target when said target is detected by both the radar based detection unit and the vision based detection unit; categorizing the matched target as a locked target when said target is iteratively identified as the matched target for a pre-defined duration; and tracking the locked target using information received from the radar based detection unit, wherein said tracking is performed even in the event when said locked target is subsequently not detected by the vision based detection unit.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

Some of the objects of the present disclosure, which at least one embodiment herein satisfies are as listed herein below.

It is an object of the present disclosure to provide system and method for confirmation, tracking and selection of a target for vehicle control that reduces dependency over vision based detection unit, thereby providing better efficiency in low visibility conditions.

It is another object of the present disclosure to provide system and method for confirmation, tracking and selection of the target that overcomes inherent disadvantage of inaccuracy in determination of lateral distance by radar based detection unit.

It is another object of the present disclosure to provide system and method for confirmation, tracking and selection of the target for vehicle control and feature operation with minimum overlap (between host vehicle and target) condition.

It is yet another of object of the present disclosure is to provide system and method for confirmation, tracking and selection of the target that reduces false brake conditions by the host vehicle.

It is yet another object of the present disclosure to provide system and method that locks target in the radar and/or camera field of view, which can be utilised instantly for control once the target enters into vehicle path or driving lane.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1:
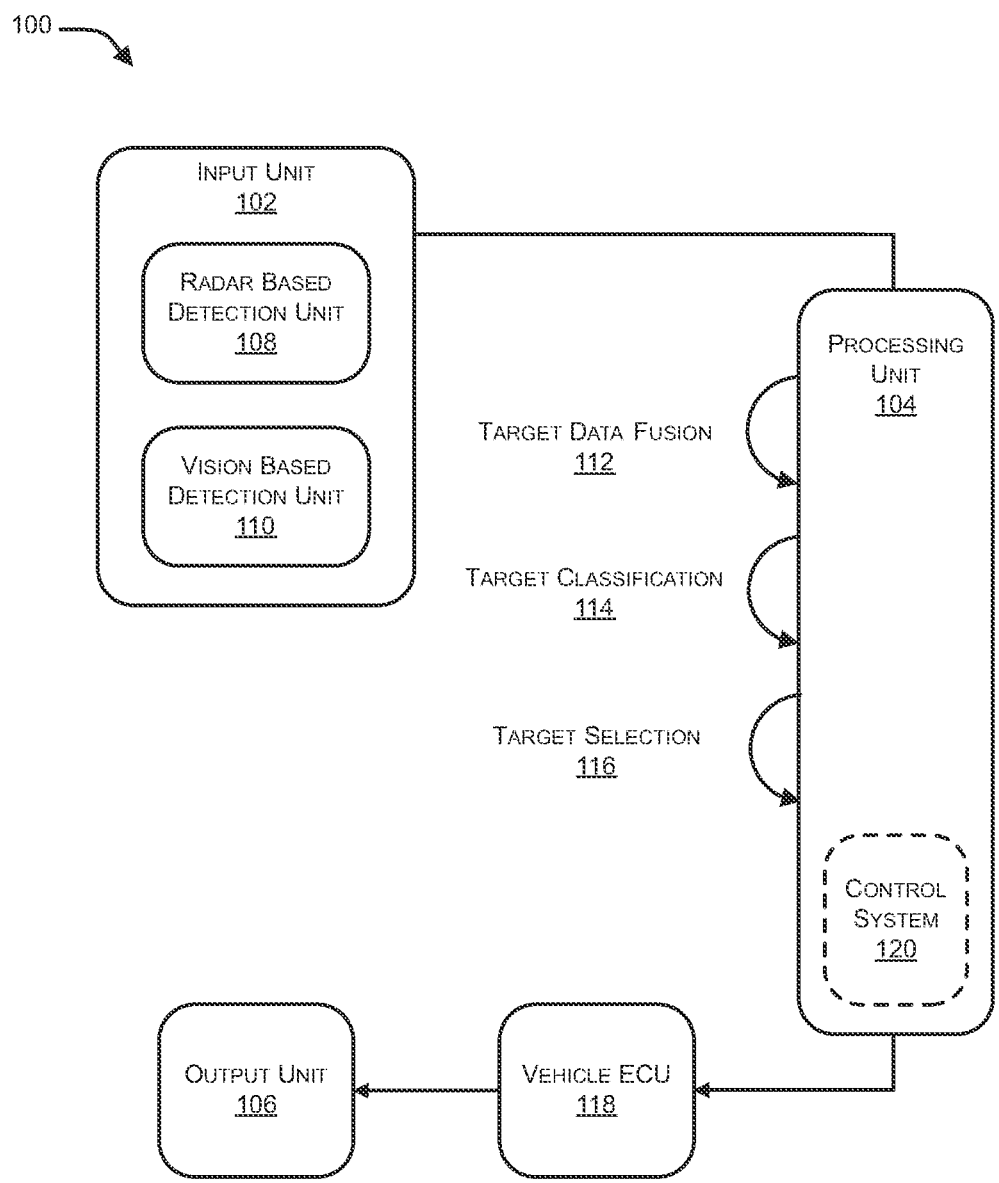
FIG. 1 illustrates exemplary architecture of a system to illustrate its overall working in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to the field of vehicle automation. More particularly, the present disclosure relates to system and method for confirmation, tracking and selection of a target that is to be utilized for control of host vehicle.

According to an aspect of the present disclosure, a system implemented in a host vehicle, comprises: a radar based detection unit, comprising one or more radar sensors, for detecting one or more targets around the host vehicle and associating a radar target identifier with each of said detected one or more targets; a vision based detection unit, comprising one or more image sensors, for detecting one or more targets in the field of view of the host vehicle and associating a vision target identifier with each of said detected one or more targets; and a processing unit comprising a processor coupled with a memory, the memory storing the instructions executable by the processor to: receive information corresponding to detected one or more targets from each of the radar based detection unit and the vision based detection unit, wherein the information comprises lateral distance, longitudinal distance and velocity components of the detected one or more targets from the host vehicle; match each of the one or more targets detected by the radar based detection unit with one or more targets detected by vision based detection unit to identify a target as a matched target when said target is detected by both the radar based detection unit and the vision based detection unit; categorize the matched target as a locked target when said target is iteratively identified as the matched target for a pre-defined duration; and track the locked target using information received from the radar based detection unit, wherein said tracking is performed even in the event when said locked target is subsequently not detected by the vision based detection unit.

In an embodiment, the target is identified as the matched target when location of said target detected by the vision based detection unit is within any or a combination of a lateral error band or a longitudinal error band of location of said target detected by radar based detection unit.

In an embodiment, the longitudinal error band is larger than the lateral error band.

In an embodiment, the processing unit maintains a record of radar target identifiers and vision target identifiers of each of a set of targets, which are identified as matched targets.

In an embodiment, the processing unit further classifies each target of the set of targets into one or more classes based on attributes of the target.

In an embodiment, the processing unit further identifies a single target from a set of targets, which are identified as matched targets, by: separating each of the targets of the set of targets into either of lane targets or path targets based on class information of each of the targets; selecting a dominant target from targets associated with each class of the one or more classes; and selecting a single target from the selected dominant targets based on a priority level associated with each class of the one or more classes.

In an embodiment, the processing unit provides control signals for controlling of the host vehicle to an electronic control unit (ECU) operatively coupled with the processing unit and the host vehicle.

In an embodiment, the processing unit provides the control signals based on attributes of the selected single target.

Another aspect of the present disclosure relate to a method, carried out according to instructions stored in a computer implemented in a host vehicle, comprising: receiving information corresponding to detected one or more targets from each of a radar based detection unit and a vision based detection unit, wherein the information comprises lateral distance, longitudinal distance velocity components of the detected one or more targets from the host vehicle, and wherein a radar based detection unit comprises one or more radar sensors to detect one or more targets around the host vehicle and a vision based detection unit comprises one or more image sensors to detect one or more targets in the field of view of the host vehicle; matching each of the one or more targets detected by the radar based detection unit with one or more targets detected by vision based detection unit to identify a target as a matched target when said target is detected by both the radar based detection unit and the vision based detection unit; categorizing the matched target as a locked target when said target is iteratively identified as the matched target for a pre-defined duration; and tracking the locked target using information received from the radar based detection unit, wherein said tracking is performed even in the event when said locked target is subsequently not detected by the vision based detection unit.

Various embodiments of the present disclosure provide techniques utilized for perception sensors based fusion system for controlling of the host vehicle. Perception sensors or systems are sensors and/or algorithm suite that are implemented in host vehicle to perceive surrounding environment. Perception sensors may include units for object classification, detection and tracking, and the like as well as sensors such as radar, Light Detection and Ranging (LIDAR), camera, High-Definition (HD) maps and the like. In Advanced Driver Assistance Systems (ADAS) or Autonomous Drive (AD) Systems, perception sensor said in achieving lowest level to highest level of vehicle autonomy. The present disclosure relates to perception sensors based fusion system for vehicle control. More particularly, the present disclosure relates to system and method for confirmation, tracking and selection of target that is utilized for vehicle control. In a preferred embodiment, the present disclosure provides radar and camera-based fusion for vehicle control.

FIG. 1 illustrates exemplary architecture of a system to illustrate its overall working in accordance with an embodiment of the present disclosure.

According to an embodiment, a system 100 implemented in a host vehicle comprises an input unit 102, a processing unit 104 and an output unit 106. The input unit 102 comprises a radar based detection unit 108 and a vision based detection unit 110. The radar based detection unit 108 includes one or more radar sensors for detecting targets around the host vehicle and associates a radar target identifier (radar target ID) with each of the detected targets. The vision based detection unit 110 includes one or more image sensors for detecting targets in the field of view of the host vehicle and associates a vision target identifier (vision target ID) with each of the detected targets.

In an exemplary implementation, the radar sensors for short-range, medium-range, or long range detection may be located in front, back and side of the host vehicle. Further, the image sensors or cameras configured in the host vehicle can capture images of field of view of the host vehicle. In an implementation, the image sensors or the cameras may be placed in front, back or side portion of the host vehicle. The processing unit 104 may comprise a processor and a memory and/or may be integrated with existing systems and controls of a vehicle to form an ADAS or AD systems, or augment an existing ADAS or AD systems. For instance, the processing engine 104 can be operatively coupled with control system 120 such that the signals generated by the processing unit 104 may be sent to ECU 118 through control system 120 for controlling of the host vehicle. The processing unit 104, the or the ECU 118 can be coupled with the output unit 106, which maybe a display device or any other audio-visual device to provide audio and/or visual indications to driver of the host vehicle when a target is detected.

According to an aspect, during target data fusion 112, the processing unit 104 receives information corresponding to the detected targets from each of the radar based detection unit 108 and the vision based detection unit 110. The information includes lateral distance, longitudinal distance and velocity components of the detected targets from the host vehicle. During target classification 114, the processing unit 104, classifies each target into one or more classes based on attributes of the detected target. For instance, the processing unit 104, matches each of the targets detected by the radar based detection unit 108 with targets detected by vision based detection unit 110 to identify a target as a matched target when said target is detected by both the radar based detection unit 108 and the vision based detection unit 110. The processing unit 104 further categorizes the matched target as a locked target when said target is iteratively identified as the matched target for a pre-defined duration. The locked target can then be tracked using information received from the radar based detection unit 108 such that the tracking is performed even when the locked target is subsequently not detected by the vision based detection unit 110.

In an embodiment, during target selection 116, the processing unit 104 identifies a single target from a set of targets, which are identified as matched targets, by separating each of the targets of the set of targets into either of lane targets or path targets based on class information of each of the targets, selecting a dominant target from targets associated with each class of the one or more classes and selecting a single target from the selected dominant targets based on a priority level associated with each class of the one or more classes.

In an embodiment, the processing unit 104 provides control signals for controlling of the host vehicle to the ECU 118 through the control system 120. The control signals are provided based on attributes of the selected single target. The ECU 118 may provide engine torque, deceleration control interfaces as well as necessary feedback required for closed loop control.

Figure 2:
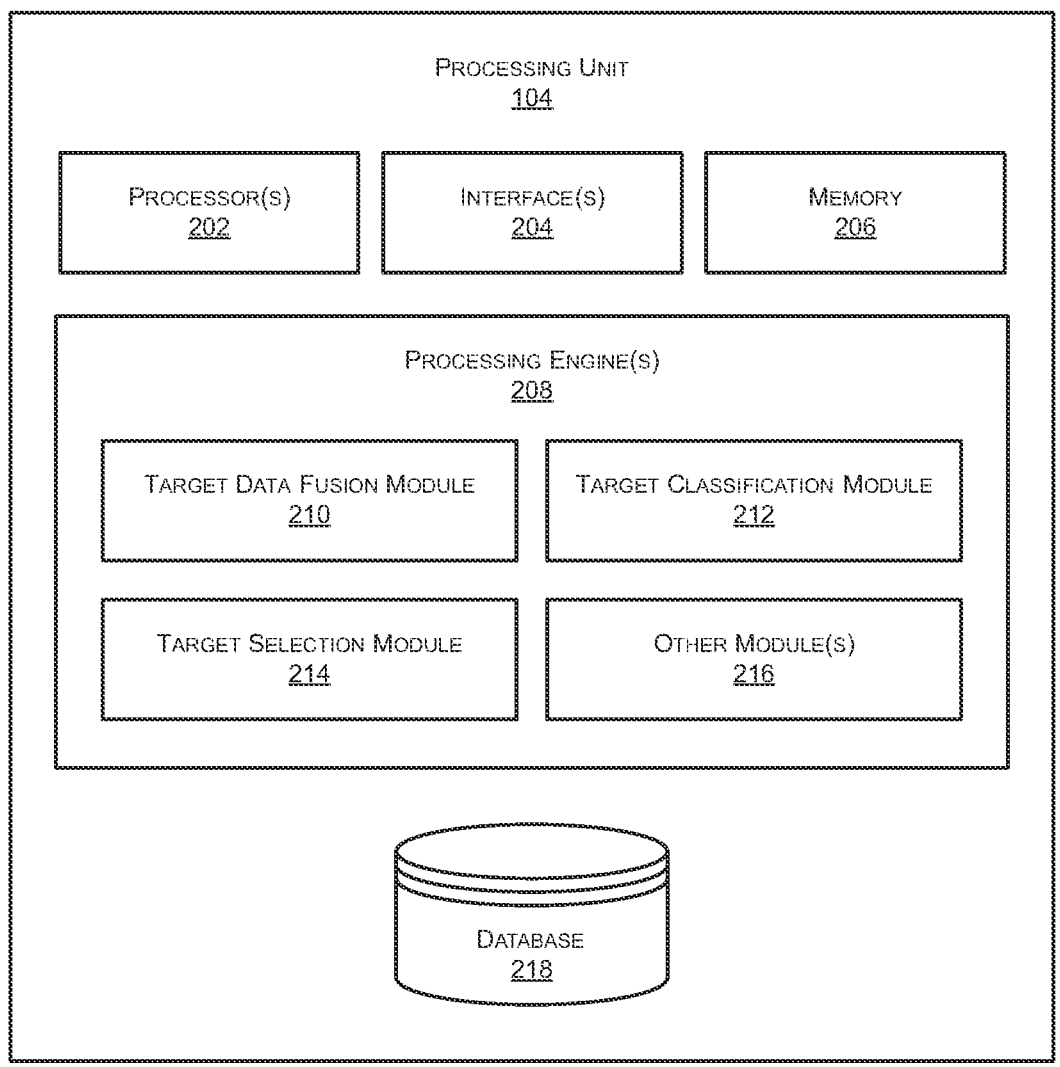
FIG. 2 illustrates exemplary modules of a processing unit in accordance with an embodiment of the present disclosure.

FIG. 2 illustrates exemplary modules of a processing unit in accordance with an embodiment of the present disclosure.

In an aspect, the processing unit 104 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 206 of the processing unit 104. The memory 206 may store one or more computer-readable instructions or routines, which may be fetched and executed to create or share the data units over a network service. The memory 206 may comprise any non-transitory storage device including, for example, volatile memory such as RAM, or non-volatile memory such as EPROM, flash memory, and the like.

The processing unit 104 may also comprise an interface(s) 204. The interface(s) 204 may comprise a variety of interfaces, for example, interfaces for data input and output devices, referred to as I/O devices, storage devices, and the like. The interface(s) 204 may facilitate communication of processing unit 104 with various devices coupled to the processing unit 104 such as the input unit 102, the ECU 118 and the output unit 106. The interface(s) 204 may also provide a communication pathway for one or more components of the processing unit 104. Examples of such components include, but are not limited to, processing engine(s) 208 and data 218.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the processing unit 104 may comprise the machine-readable storage medium storing the instructions and the processing resource to execute the instructions, or the machine-readable storage medium may be separate but accessible to processing unit 104 and the processing resource. In other examples, the processing engine(s) 208 may be implemented by electronic circuitry. The data 218 may comprise data that is either stored or generated as a result of functionalities implemented by any of the components of the processing engine(s) 208.

In an exemplary embodiment, the processing engine(s) 208 may comprise a target data fusion module 210, a target classification module 212, a target selection module 214 and other module(s) 216.

Target Data Fusion Module 210

In an aspect, the target data fusion module 210 receives information corresponding to targets detected by each of the radar based detection unit and the vision based detection unit. The information includes lateral distance, longitudinal distance and velocity components of the detected targets from the host vehicle. The radar based detection unit includes one or more radar sensors to detect targets around the host vehicle and associates a radar target ID with each of the detected. Similarly, the vision based detection unit includes one or more image sensors to detect targets in the field of view of the host vehicle and associates a vision target ID with each of the detected targets.

Target Classification Module 212

In an embodiment, the target classification module 212 classifies each target of a set of detected targets into one or more classes based on attributes of the target. The attributes of the target may include lateral distance, longitudinal distant and velocity components of the said target from the host vehicle.

Figure 3:
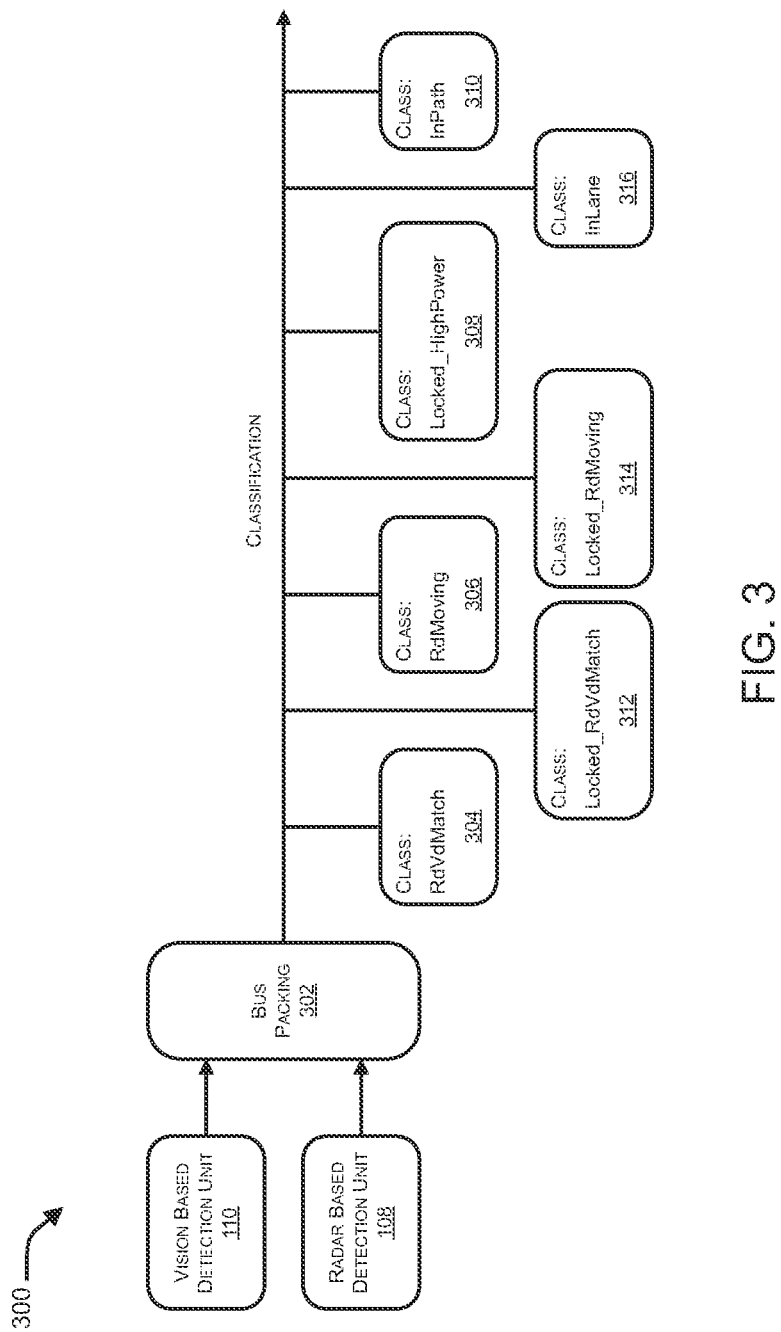
FIG. 3 represents an exemplary representation of classification of the targets into various classes in accordance with an embodiment of the present disclosure.

FIG. 3 represents an exemplary representation of classification of the targets into various classes such as matched targets (RdVdMatch) 304, locked targets (Locked_RdVdMatch) 312, moving targets detected by radar based detection unit (RdMoving) 306, locked targets detected as moving target by radar based detection unit (Locked_RdMoving) 314, locked high power (Locked_HighPower) 308, target in driving lane of host vehicle (InLane) 316 and target in path of host vehicle (InPath) 310.

In context of an example as illustrated in FIG. 3, the target classification module 212 provides information from the radar based detection unit and the vision based detection unit in to a generic bus structure 302. Subsequently, the bus 302 is circulated through entire application to provide ease of access.

In an aspect, the target classification module 212 matches each target detected by the radar based detection unit with the targets detected by vision based detection unit so that a target is identified as a matched target when said target is detected by both the radar based detection unit and the vision based detection unit. A target may be identified as the matched target (RdVdMatch) when location of the target detected by the vision based detection unit is within any or a combination of a lateral error band or a longitudinal error band of location of said target detected by radar based detection unit. In a preferred embodiment, the longitudinal error band is larger than the lateral error band. Further, the target classification module 212 maintains a record of radar target IDs and vision target IDs of each of a set of targets, which are identified as matched targets (RdVdMatch). The target classification module 212 further categorizes the matched target RdVdMatch) as a locked target when the target is iteratively identified as the matched target for a pre-defined duration.

Figure 4:
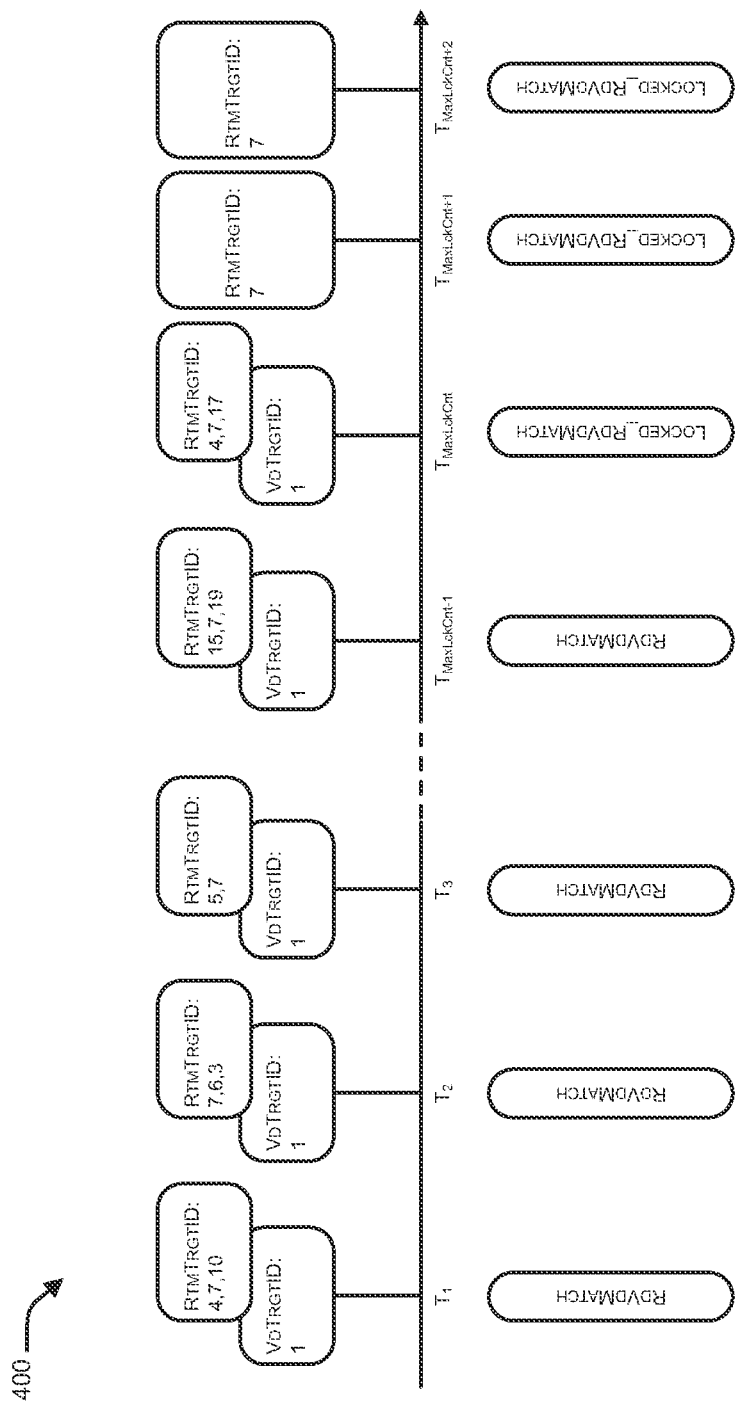
FIG. 4 illustrates an exemplary representation of determination of a locked target in accordance with an embodiment of the present disclosure.

FIG. 4 illustrates an exemplary representation of determination of a locked target in accordance with an embodiment of the present disclosure.

In context of the example as illustrated in FIG. 4, a target may be determined as a matched if the target detected by the vision based detection unit falls within some longitudinal and lateral error band. Further, due to inherent longitudinal distance inaccuracy of the target detected by the vision based detection unit, the longitudinal error band is kept large as compared to the lateral error band. In contrast when a matched target is detected, due to poor lateral distance accuracy of the target detected by the radar based detection unit, lateral distance of the target detected by the radar based detection unit is replaced by the with lateral distance of the target detected by the vision based detection unit.

As illustrated in FIG. 4, the target classification module 212 continuously maintains a record of radar target IDs (RtmTrgtID) that match with particular vision target IDs (VdTrgtID). Out of all matched radar target IDs, a common radar target ID is selected as locked target if locking timeout occurs (TMaxLckCnt) i.e. if the target is identified as a matched target for a pre-defined duration. It would be pertinent to note that once a radar target ID is locked, the target classification module 212 may not check for matched target. Therefore, in an event if association failure occurs, (which may either be due to detection loss or high lateral error in a target detected by the radar based detection unit), the system may keep providing reliable and trustworthy target. Further, it would be pertinent to note that, any locked target may be unlocked when either radar target ID or vision target ID of the target is deleted or a sudden jump in the longitudinal and/or lateral distance is detected.

Thus, those skilled in the art would appreciate that the target classification module 212 continuously maintains record of radar target IDs that are matched with a particular vision target ID and from said maintained record, a target with common radar target ID is selected as locked target. Further, the locked target can be classified into various categories, such as: Locked_RdVdMatch: A target is classified as Locked_RdVdMatch, if the target is being or had been RdVdMatch, consistently for more than a pre-defined duration. Locked_RdMoving: A target is classified as Locked_RdMoving, if the locked target is moving (RdMoving), consistently for more than a pre-defined duration. Based on characteristics identified by the radar based detection unit, a target may be classified as a moving target (RdMoving), if the velocity of the target is more than a certain threshold (instead of 0 Km/h). Locked_RdVdMatch_RdMoving: A target is classified as Locked_RdVdMatch_RdMoving, if the target satisfies the criteria for both Locked_RdVdMatch and Locked_RdMoving. Locked_HighPower: A target is classified as Locked_HighPower, when the target is stationary and is a high power target (e.g. target having large reflecting surface, commercial vehicle), consistently for a pre-defined duration.

According to an embodiment, once a target is classified as Locked_RdVdMatch, the target may not require detection by the vision based detection unit. Thus, during low visibility condition and unstable camera detection dependency over vision based detection unit is reduced. Further, radar based detection unit may detect non-vehicle (e.g. guard rail, overhead signs etc.) as well as false targets which are stationary in nature, which may prohibit utilizing actual stationary targets (vehicles) for the purpose of control of the host vehicle. Therefore, the system of the present disclosure allows using stationary targets, which are locked (By RdVdMatch and/or RdMoving, HighPower) for the purpose of control of the host vehicle.

Target Selection Module 214

In an embodiment, the target selection module 214 identifies a single target from a set of targets, which are identified based on target classification. The identification of the single target is performed by separating each targets of the set of targets into either of lane targets or path targets based on class information (associated class) of each of the targets, selecting a dominant target from targets associated with each class of the one or more classes, and selecting a single target from the selected dominant targets based on a priority level associated with each class of the one or more classes. Those skilled in the art would appreciate that identification of a single target is required to be used for longitudinal and/or lateral control of the host vehicle.

Figure 5:
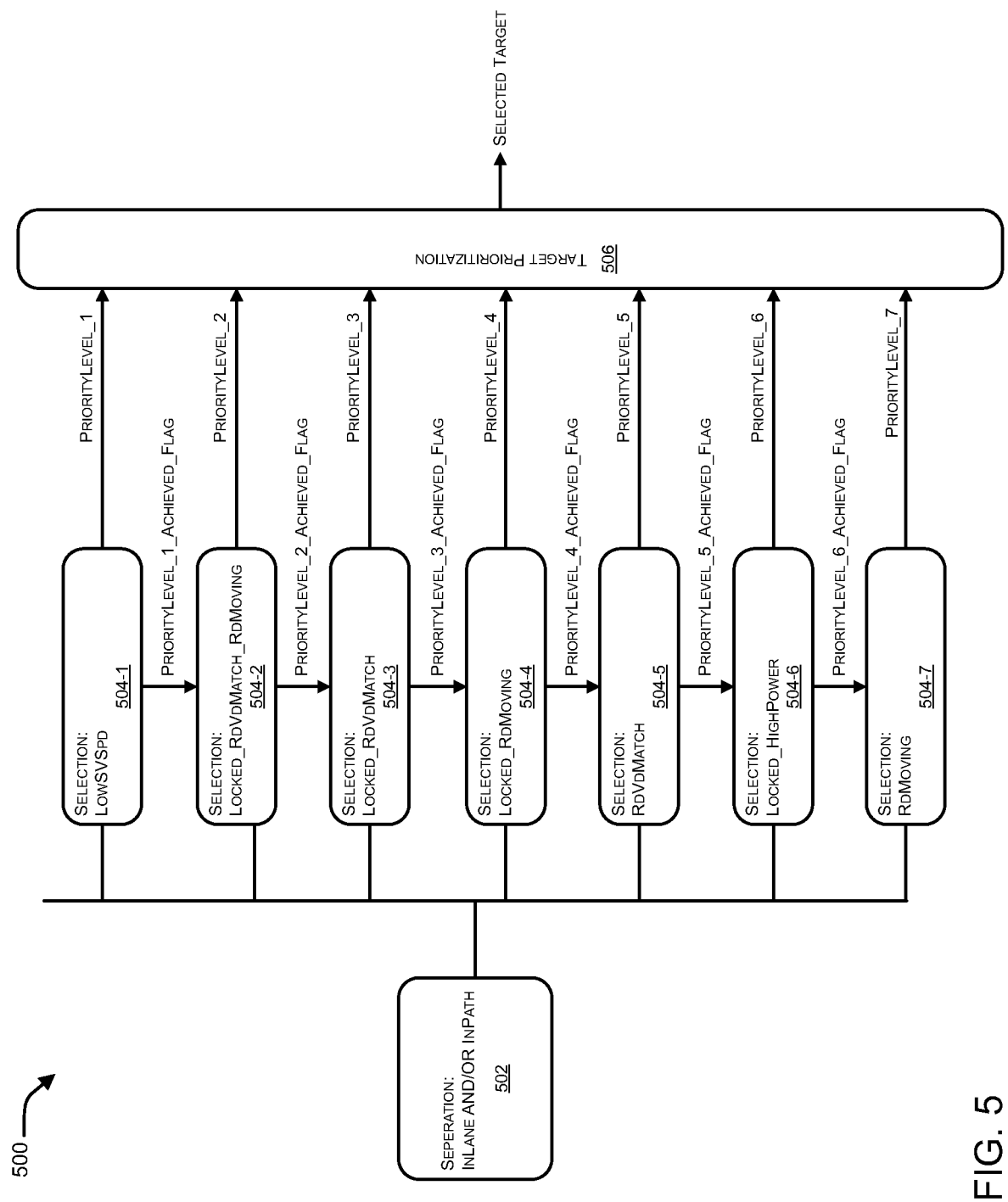
FIG. 5 illustrates exemplary representation of selection of a single target vehicle in accordance with an embodiment of the present disclosure.

FIG. 5 illustrates exemplary representation of selection of a single target vehicle in accordance with an embodiment of the present disclosure.

In context of an example as illustrated in FIG. 5, at block 502, In Lane and/or In Path targets are separated using target class information maintained by the target classification module 212. In an embodiment, lane information of the host vehicle (e.g. right and left line or curve) may be provided by the vision based detection unit. Further, based on the lane information, it can be determined whether any of the targets is within the lane area. If any target is within lane area, it can be classified as In Lane target. InPath target means the target that is near the host vehicle path, within some lateral offset or range. The host vehicle path may be calculated from the host vehicle yaw rate and speed.

At blocks 504-1 to 504-7 a dominant target from each defined class (if any target available) is selected. The selected dominant targets from each class are further sent to target prioritization block 506, which selects a target based on priority levels. Exemplary priority levels are as illustrated in FIG. 5 (with PriorityLevel_1 being highest priority and PriorityLevel_7 being the lowest priority). In an embodiment, when a higher priority level target is detected, lower priority level targets are not determined in order to reduce computational load.

In an example, the highest priority target selection level, i.e., LowSVSpd, is only used if host vehicle moving at relatively low speed (e.g. <~15 Km/h). At low speed of host vehicle, it is safer to rely on target detected by radar based target detection unit without requiring a match with target detected by vision based target detection unit and movement check. Hence, such a situation, any type of nearest, radar only, In Path and/or In Lane target is selected as single target.

Those skilled in the art would appreciate that selection of a single target by the target selection module 214 based on locked targets would improve performance of the control mechanism of the host vehicle. For example, chances of false braking by the host vehicle are reduced. Thus, a reliable target is selected for control mechanism, which improves safety and comfort level of the host vehicle.

Those skilled in the art would appreciate that embodiments of the present disclosure have shown promising results and performance. Exemplary experimental details have been discussed below.

Figure 6A:
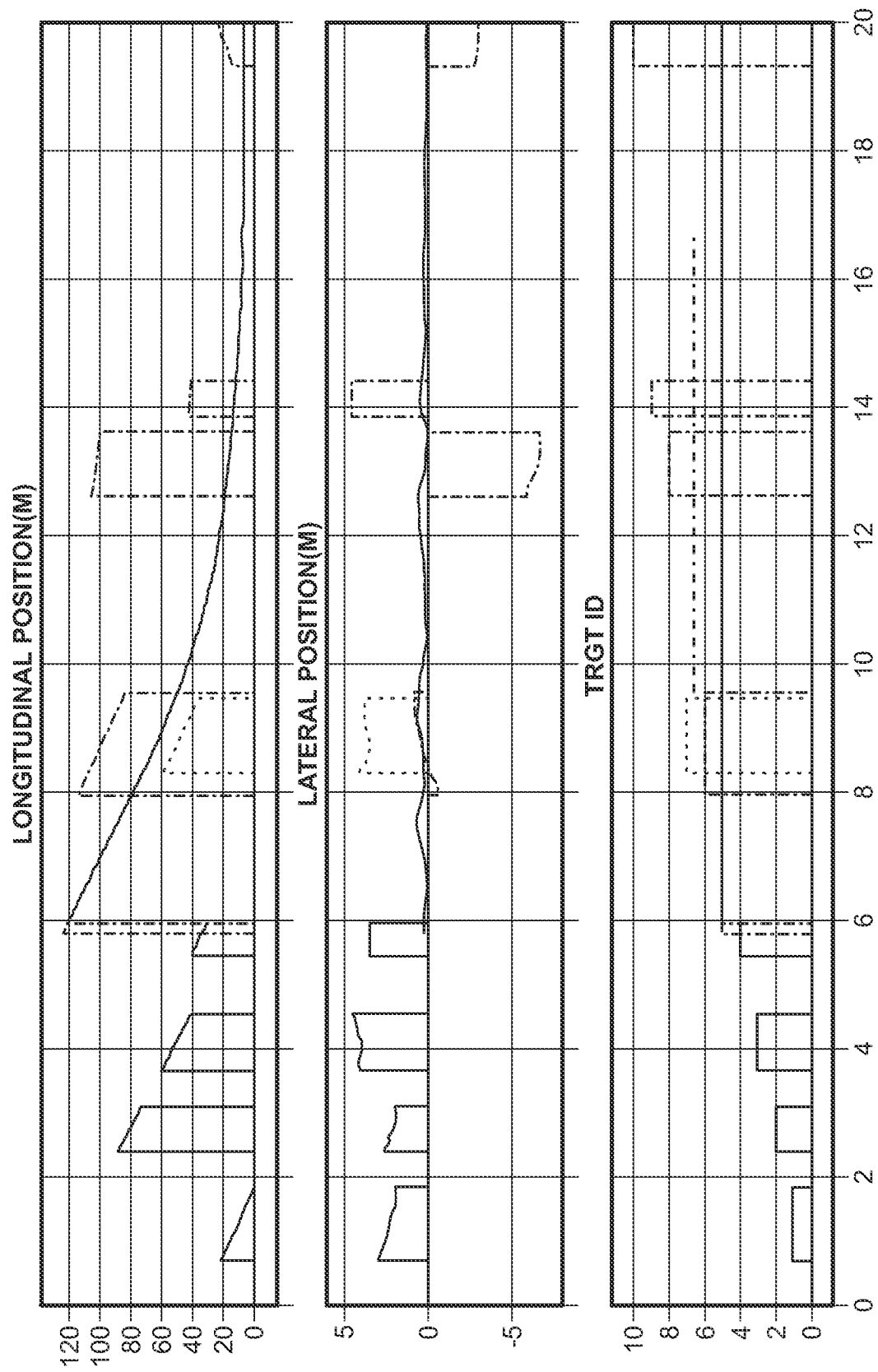
FIG. 6A-C illustrate experimental results obtained with an exemplary test scenario in accordance with an embodiment of the present disclosure.
Figure 6B:
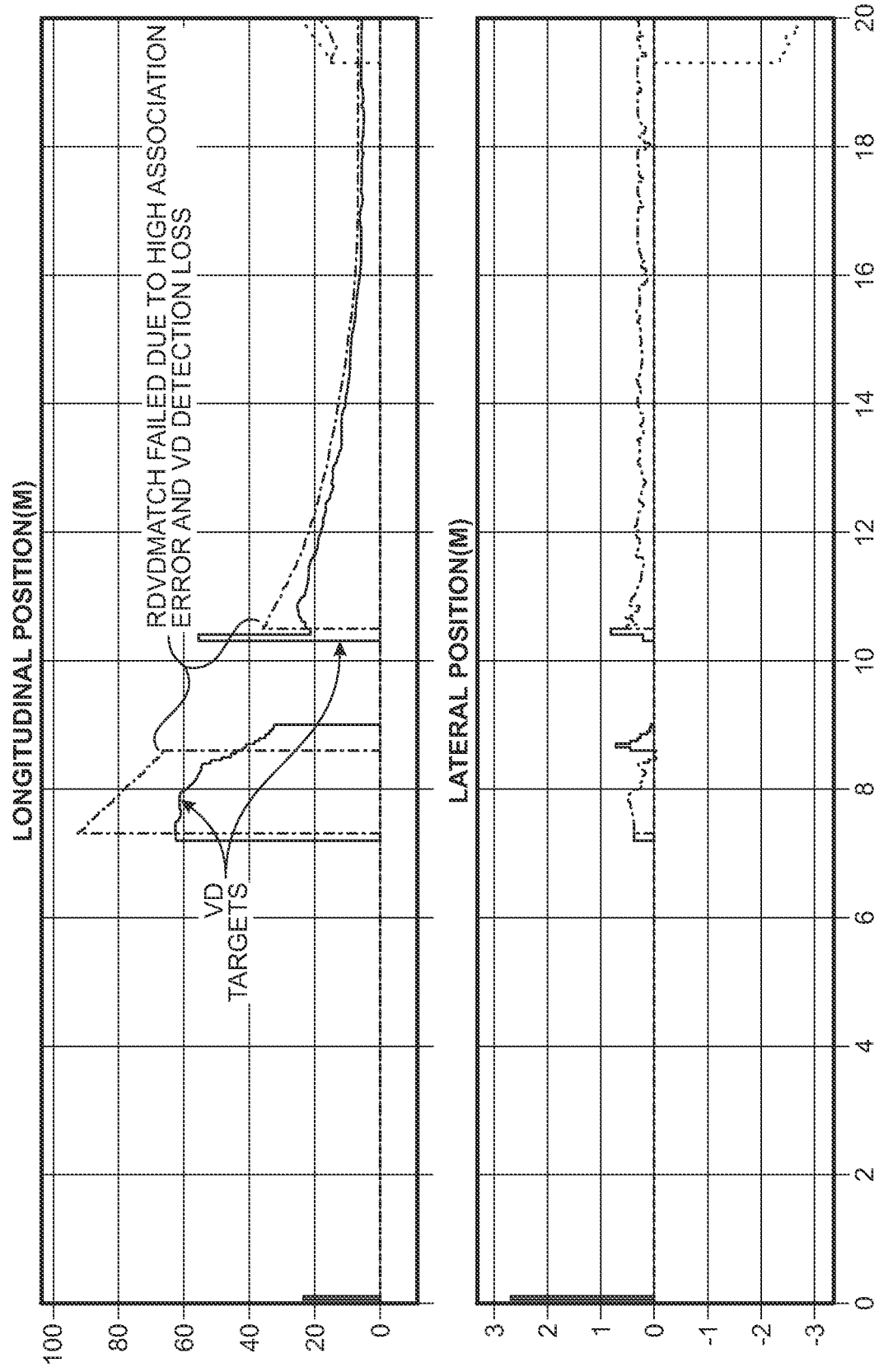
Figure 6C:
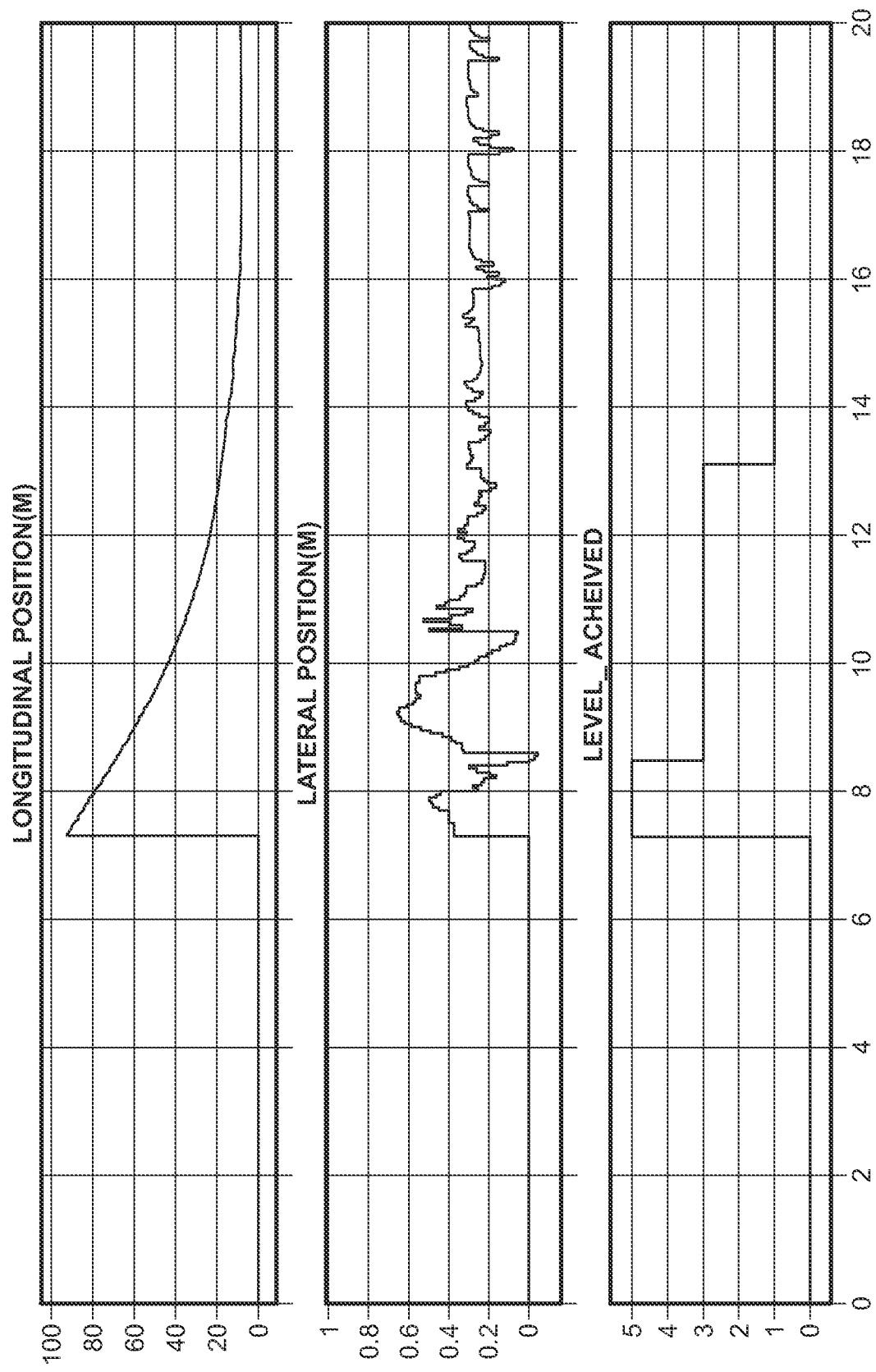

FIG. 6A-C illustrate experimental results obtained with an exemplary test scenario in accordance with an embodiment of the present disclosure.

According to a test scenario, a target vehicle was kept stationary and host vehicle was cruising at a certain speed. For efficient performance, once the target vehicle approaches within radar/camera field of view, the host vehicle would automatically decelerate and stop at certain safe distance. FIG. 6A illustrates processed targets that are outputs of target data fusion module. The radar based detection unit used for in-vehicle testing may provide up to 64 targets, hence, the output of the target data fusion module can provide 64 targets. All available targets (according to radar target IDs) were plotted with different colours. FIG. 6B illustrates all targets detected by vision based detection unit as well as radar based detection unit that are identified as matched targets. At this point, it would be pertinent to note that targets detected by the vision based detection unit have more accurate lateral position as compared to targets detected by radar based detection unit. Therefore, if any target detected by radar based detection unit matches with the target detected by the vision based detection unit, the lateral distance of the target detected by the radar based detection unit is replaced with lateral distance of the target detected by the vision based detection unit. Hence, in the plot of FIG. 6B, lateral distances of the target detected by the radar based detection unit and the vision based detection unit are overlapped for specific time duration. Further, during the experiment, RdVd Match was failed due to large association error and vision detection loss. However, due to detection of a locked target, the selected target remained consistent as illustrated in FIG. 6C. Exemplary levels achieved (Level_Achieved) may be analysed using table 1.

TABLE 1

| Level_Achieved Code | |
| --- | --- |
| Level_Achieved Value | Level |
| 0 | Target unavailable |
| 1 | LowSVSpd |
| 2 | Locked_RdVdMatch_RdMoving |
| 3 | Locked_RdVdMatch |
| 4 | Locked_RdMoving |
| 5 | RdVdMatch |

TABLE 1-continued

| Level_Achieved Code | |
| --- | --- |
| Level_Achieved Value | Level |
| 6 | Locked_HighPower |
| 7 | RdMoving |

Figure 7A:
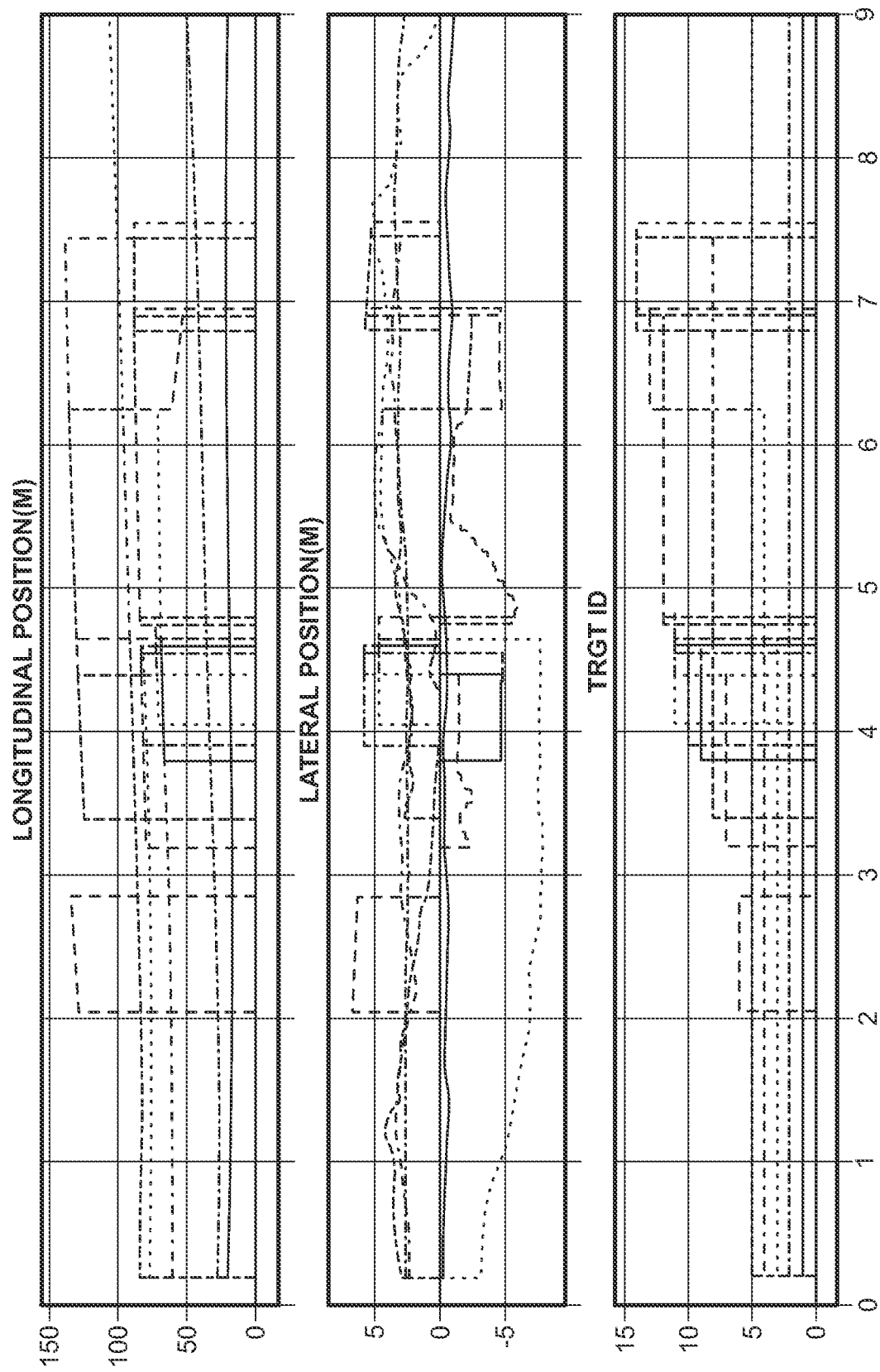
FIG. 7A-C illustrate experimental results obtained with another exemplary test scenario in accordance with an embodiment of the present disclosure.
Figure 7B:
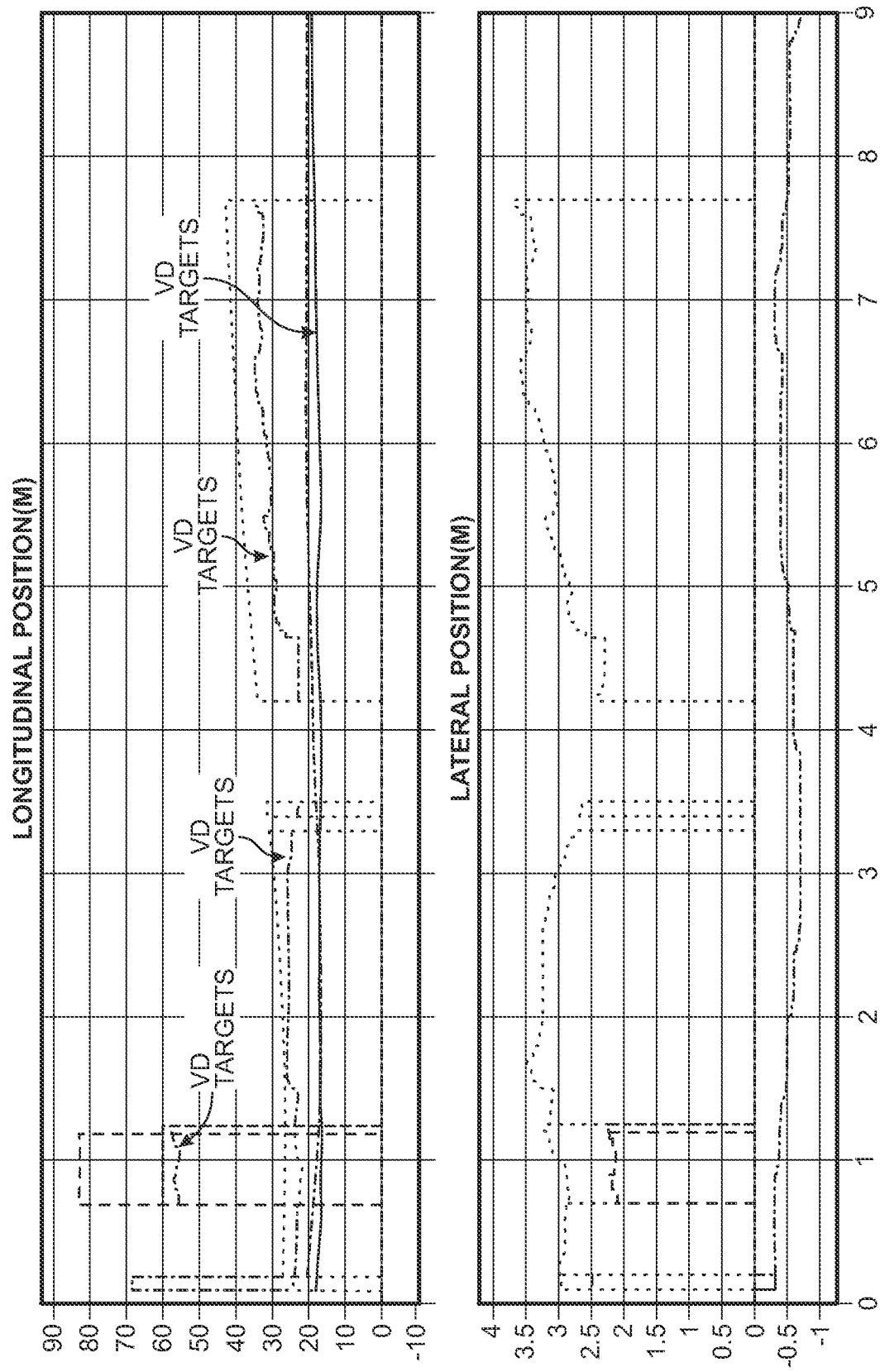
Figure 7C:
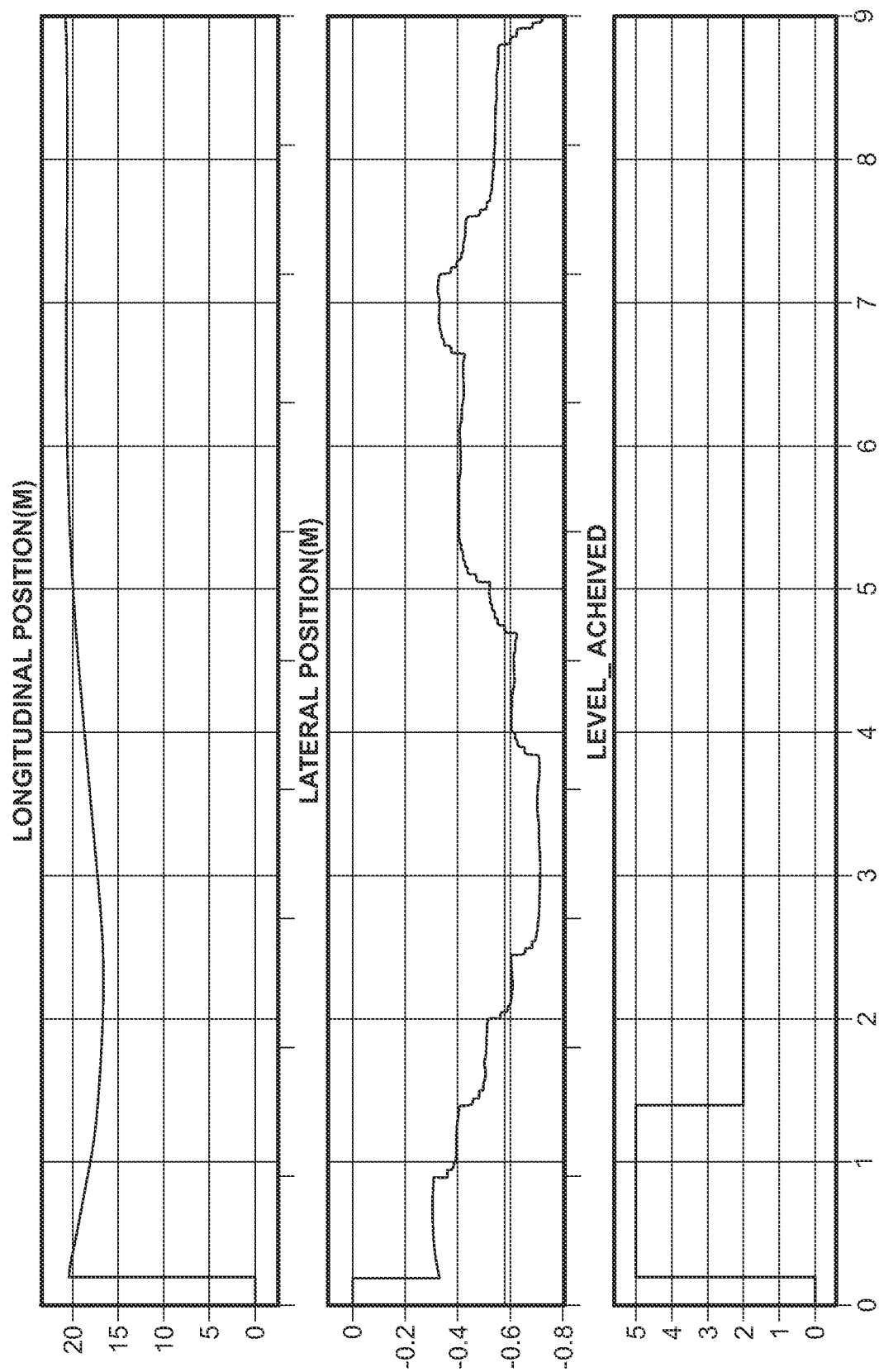

FIG. 7A-C illustrate experimental results obtained with another exemplary test scenario in accordance with an embodiment of the present disclosure.

Another test scenario relates to ACC follow mode, where host vehicle follows a target moving at certain constant speed. FIG. 7A illustrates processed targets that are outputs of target data fusion module. All available targets (according to target IDs) are plotted with different colours. FIG. 7B illustrate all targets which are detected by vision based detection unit as well as radar based detection unit and are identified as matched targets. As lateral position of the target detected by the radar based detection unit is replaced by lateral position of the matched target detected by the vision based detection unit, in this plot, target lateral distances overlap for specific time duration.

FIG. 7C illustrates a selected target, which is used for control of the host vehicle. During follow condition, Locked_RdVdMatch_RdMoving, which has highest priority as well as highest confidence class in moving vehicles condition, was achieved (refer to Table 1 for Level_Achieved code).

Figure 8:
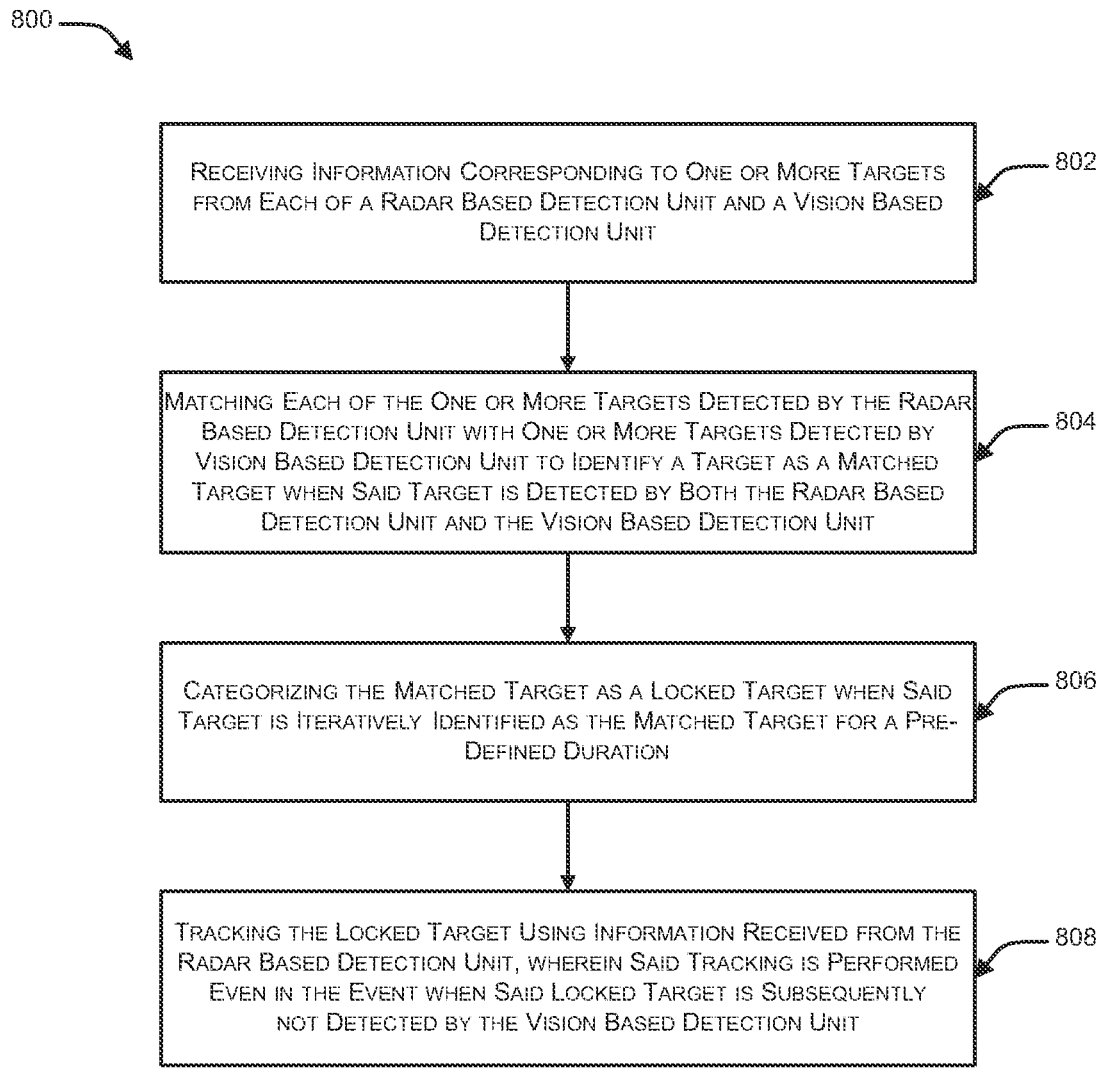
FIG. 8 illustrates an exemplary method for confirmation and tracking of a target in accordance with an embodiment of the present disclosure.

FIG. 8 illustrates an exemplary method for confirmation and tracking of a target in accordance with an embodiment of the present disclosure.

In an aspect, the proposed method may be described in general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks may be combined in any order to implement the method or alternate methods. Additionally, individual blocks may be deleted from the method without departing from the spirit and scope of the subject matter described herein. Furthermore, the method may be implemented in any suitable hardware, software, firmware, or combination thereof. However, for ease of explanation, in the embodiments described below, the method may be considered to be implemented in the above described system.

In an aspect, a method comprises, at block 802, receiving information corresponding to detected one or more targets from each of a radar based detection unit and a vision based detection unit. The radar based detection unit comprises one or more radar sensors to detect one or more targets around the host vehicle and the vision based detection unit comprises one or more image sensors to detect one or more targets in the field of view of the host vehicle. The information comprises lateral distance, longitudinal distance and velocity components of the detected one or more targets from the host vehicle.

In an aspect, the method further includes, at block 804, matching each of the one or more targets detected by the radar based detection unit with one or more targets detected by vision based detection unit to identify a target as a matched target when said target is detected by both the radar based detection unit and the vision based detection unit and at block 806, categorizing the matched target as a locked target when said target is iteratively identified as the matched target for a pre-defined duration.

In an aspect, the method further includes, at block 808, tracking the locked target using information received from the radar based detection unit, wherein said tracking is performed even in the event when said locked target is subsequently not detected by the vision based detection unit.

Those skilled in the art would appreciate that the techniques disclosed herein reduces dependency over the vision based detection system, which aid in improving performance in low visibility conditions. However, the vision based detection unit assists in case when there is any inaccuracy in lateral distance determined by the radar based detection unit. Selection of a high confidence single target allows increasing of lateral region of interest in selection of In Path target, which consequently, provides stable target for vehicle control and feature operation with minimum overlap (between host vehicle and target) condition. Various embodiments of the present disclosure advantageously reduce false brake conditions by the host vehicle due to selection of a high confidence single target. The locked target can be utilized instantly for control of the host vehicle once the locked target enters in to vehicle path or driving lane of the host vehicle.

As elaborated above, various embodiments of the present disclosure utilize several unique features. For example, targets detected by the vision based detection unit and the radar based detection unit are matched and classified into various classes. Locked targets are identified based on their consistency of match for particular time duration. Once a target is classified and locked (Locked_RdVdMatch), further tracking would not require input information from the vision based detection unit, as the tacking would be performed based on detection by the radar based detection unit. Further, based on classification information the targets are separated into InLane and InPath targets. Furthermore, the targets are prioritized such that selection of a single target is performed based on priority level.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

The present disclosure provides system and method for confirmation, tracking and selection of a target for vehicle control that reduces dependency over vision based detection unit, thereby providing better efficiency in low visibility conditions.

The present disclosure provides system and method for confirmation, tracking and selection of the target that overcomes inherent disadvantage of inaccuracy in determination of lateral distance by radar based detection unit.

The present disclosure provides system and method for confirmation, tracking and selection of the target for vehicle control and feature operation with minimum overlap (between host vehicle and target) condition.

The present disclosure provides system and method for confirmation, tracking and selection of the target that reduces false brake conditions by the host vehicle.

The present disclosure provides system and method that locks target in the radar and/or camera field of view, which can be utilised instantly for control once the target enters into vehicle path or driving lane.

What is claimed is:

1. A system comprising:
one or more radar sensors configured to detect one or more targets around the host vehicle and associating a radar target identifier with each of said detected one or more targets;
one or more image sensors configured to detect one or more targets in the field of view of the host vehicle and associating a vision target identifier with each of said detected one or more targets; and
a processing unit comprising a processor coupled with a memory, the memory storing the instructions executable by the processor to:
receive information corresponding to detected one or more targets from the one or more radar sensors and the one or more image sensors, wherein the information comprises lateral distance, longitudinal distance and velocity components of the detected one or more targets from the host vehicle;
match each of the one or more targets detected by the one or more radar sensors with one or more targets detected by the one or more image sensors to identify a target as a matched target when said target is detected by both the one or more radar sensors and the one or more image sensors;
categorize the matched target as a locked target when said target is iteratively identified as the matched target for a pre-defined duration; and
track the locked target using information received from the one or more radar sensors, wherein said tracking is performed even in the event when said locked target is subsequently not detected by the one or more image sensors.

2. The system of claim 1, wherein the target is identified as the matched target when location of said target detected by the one or more image sensors is within one or more of a lateral error band or a longitudinal error band of location of said target detected by the one or more radar sensors.

3. The system of claim 2, wherein the longitudinal error band is larger than the lateral error band.

4. The system of claim 1, wherein the processing unit maintains a record of radar target identifiers and vision target identifiers of each of a set of targets, which are identified as matched targets.

5. The system of claim 1, wherein the processing unit further classifies each target of the set of targets into one or more classes based on attributes of the target.

6. The system of claim 5, wherein the processing unit further identifies a single target from a set of targets, which are identified as matched targets, by:
   separating each of the targets of the set of targets into either of lane targets or path targets based on class information of each of the targets;
   selecting a dominant target from targets associated with each class of the one or more classes; and
   selecting a single target from the selected dominant targets based on a priority level associated with each class of the one or more classes.

7. The system of claim 1, wherein the processing unit provides control signals for controlling the host vehicle to an electronic control unit (ECU) operatively coupled with the processing unit and the host vehicle.

8. The system of claim 7, wherein the processing unit provides the control signals based on attributes of the selected single target.

9. A method comprising:
   receiving information corresponding to detected one or more targets from each of a radar based detection unit and a vision based detection unit, wherein the information comprises lateral distance, longitudinal distance velocity components of the detected one or more targets from the host vehicle, and wherein the radar based detection unit comprises one or more radar sensors to detect one or more targets around the host vehicle and the vision based detection unit comprises one or more image sensors to detect one or more targets in the field of view of the host vehicle;
   matching each of the one or more targets detected by the radar based detection unit with one or more targets detected by vision based detection unit to identify a target as a matched target when said target is detected by both the radar based detection unit and the vision based detection unit;
   categorizing the matched target as a locked target when said target is iteratively identified as the matched target for a pre-defined duration; and
   tracking the locked target using information received from the radar based detection unit, wherein said tracking is performed even in the event when said locked target is subsequently not detected by the vision based detection unit.

10. The method of claim 9, wherein each target of a set of targets is classified into one or more classes based on attributes of the target.

11. The method of claim 9, wherein the target is identified as the matched target when location of said target detected by the vision based detection unit is within one or more of a lateral error band or a longitudinal error band of location of said target detected by radar based detection unit.

12. The method of claim 11, wherein the longitudinal error band is larger than the lateral error band.

13. The method of claim 9, further comprising maintaining a record of radar target identifiers and vision target identifiers of each of a set of targets, which are identified as matched targets.

14. The method of claim 9, further comprising classifying each target of the set of targets into one or more classes based on attributes of the target.

15. The system of claim 14, further comprising identifying a single target from a set of targets, which are identified as matched targets, by:
   separating each of the targets of the set of targets into either of lane targets or path targets based on class information of each of the targets;
   selecting a dominant target from targets associated with each class of the one or more classes; and
   selecting a single target from the selected dominant targets based on a priority level associated with each class of the one or more classes.

16. The method of claim 9, further comprising providing control signals for controlling the host vehicle to an electronic control unit (ECU) operatively coupled with the processing unit and the host vehicle.

17. The method of claim 16, wherein providing the control signals is based on attributes of the selected single target.

18. A non-transitory computer-readable medium storing instructions which, when executed by one or more processors, cause the one or more processors to perform a method, the method comprising:
   receiving information corresponding to detected one or more targets from each of a radar based detection unit and a vision based detection unit, wherein the information comprises lateral distance, longitudinal distance velocity components of the detected one or more targets from the host vehicle, and wherein the radar based detection unit comprises one or more radar sensors to detect one or more targets around the host vehicle and the vision based detection unit comprises one or more image sensors to detect one or more targets in the field of view of the host vehicle;
   matching each of the one or more targets detected by the radar based detection unit with one or more targets detected by vision based detection unit to identify a target as a matched target when said target is detected by both the radar based detection unit and the vision based detection unit;
   categorizing the matched target as a locked target when said target is iteratively identified as the matched target for a pre-defined duration; and
   tracking the locked target using information received from the radar based detection unit, wherein said tracking is performed even in the event when said locked target is subsequently not detected by the vision based detection unit.

19. The non-transitory computer-readable medium of claim 18, wherein the target is identified as the matched target when location of said target detected by the vision based detection unit is within one or more of a lateral error band or a longitudinal error band of location of said target detected by radar based detection unit, wherein the longitudinal error band is larger than the lateral error band.

20. The non-transitory computer-readable medium of claim 18, wherein the method further comprises identifying a single target from a set of targets, which are identified as matched targets, by:
- separating each of the targets of the set of targets into either of lane targets or path targets based on class information of each of the targets;
- selecting a dominant target from targets associated with each class of the one or more classes; and
- selecting a single target from the selected dominant targets based on a priority level associated with each class of the one or more classes.

* * * * *